United States Patent [19]

Hartsaw

[11] Patent Number: 4,800,470
[45] Date of Patent: Jan. 24, 1989

[54] ILLUMINATED CARGO RACK

[76] Inventor: Robert E. Hartsaw, F-4 DonLee P.O. Box 3286, Oxford, Ala. 36203

[21] Appl. No.: 93,965

[22] Filed: Sep. 8, 1987

[51] Int. Cl.$^4$ .............................................. B60Q 1/00
[52] U.S. Cl. ...................................... 362/73; 362/251
[58] Field of Search ...................... 362/61, 80, 73, 234, 362/74, 247, 251, 249, 223, 224, 225, 222; D 26/28, 34, 35; 296/1 R, 37.7

[56] References Cited

U.S. PATENT DOCUMENTS

| | | | |
|---|---|---|---|
| 3,057,991 | 10/1962 | Grenadier | 362/146 |
| 3,077,536 | 2/1963 | Garnett | 362/249 |
| 3,131,871 | 5/1964 | Foulds | 362/222 |
| 3,358,134 | 12/1967 | Gonyea | 362/73 |
| 3,375,365 | 3/1968 | Gross | 362/73 |
| 3,544,782 | 12/1970 | Hahn | 362/222 |
| 4,161,769 | 7/1979 | Elliott | 362/146 |
| 4,426,028 | 1/1984 | Bott | 362/73 |
| 4,534,496 | 8/1985 | Bott | 362/73 |

Primary Examiner—Ira S. Lazarus
Assistant Examiner—D. M. Cox
Attorney, Agent, or Firm—Leon Gilden

[57] ABSTRACT

An illuminated cargo rack is set forth securable to motor vehicles and the like for the transport of various articles. A plurality of vertically positioned stanchions securably contained a transparent plastic light tubular member containing therein plural illuminators divided by a reflector. Each illuminated portion is selectively actuable to illuminate a surrounding area, the articles being transported, or both.

4 Claims, 1 Drawing Sheet

U.S. Patent
Jan. 24, 1989
4,800,470
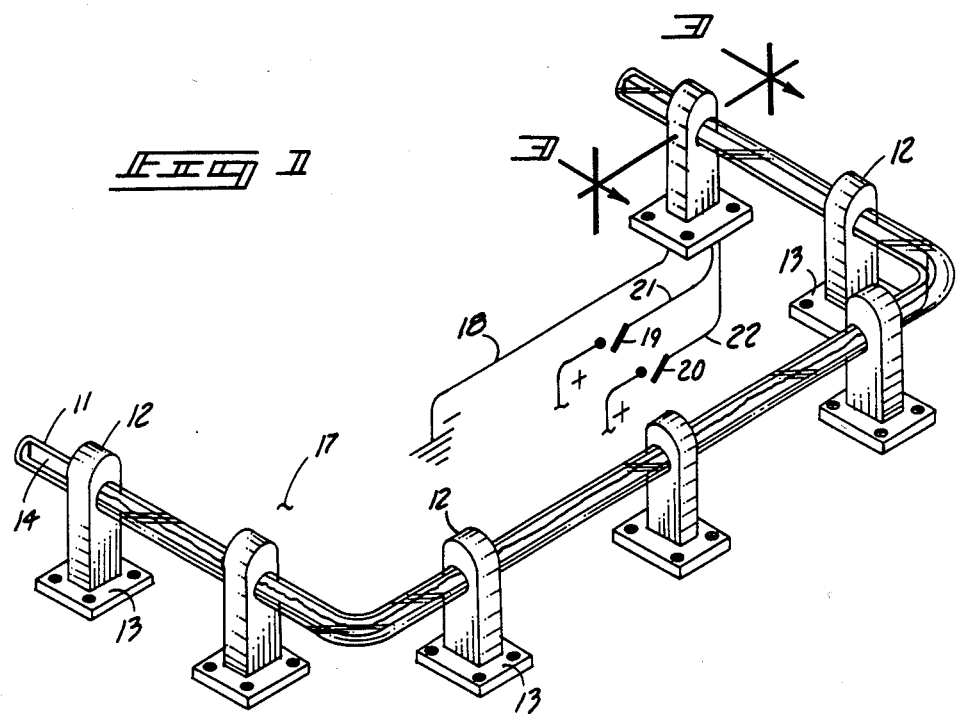
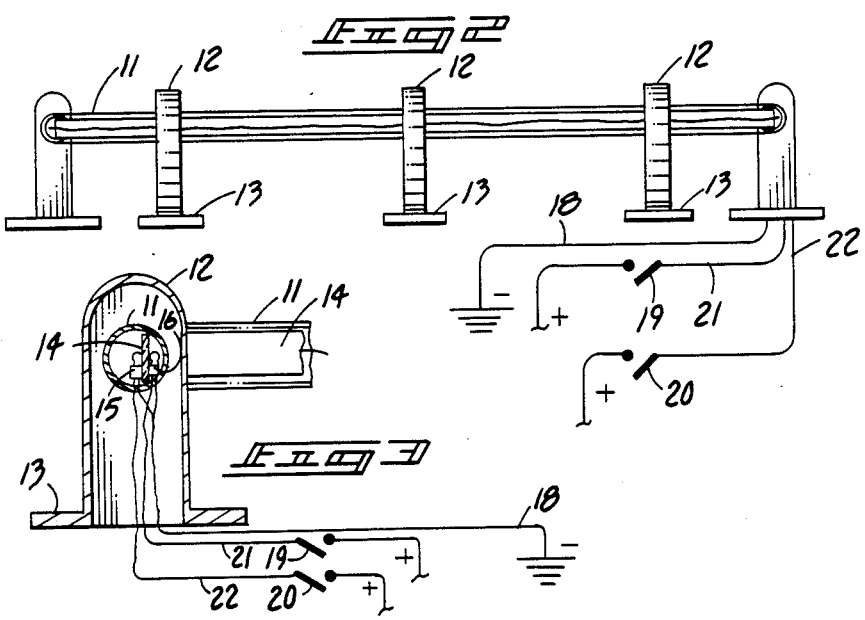

ILLUMINATED CARGO RACK

BACKGROUND OF THE INVENTION

1. Field of the Invention

The present invention relates to light bars and more particularly to a new and improved light bar which may be utilized as a roof rack and illuminator to selectively illuminate either contents contained within the perimeter of the roof rack or alternatively to illuminate an area outside the perimeter of the roof rack.

2. Description of the Prior Art

The use of light bars and indicating illuminating apparatus is well known in the prior art. As may be appreciated these devices in the past have been limited to single functions or of limited utility when applied to practical applications, such as the transport of roof top cargo. Furthermore, prior art devices have tended to be somewhat bulky and requiring the necessary space for positioning of individual lights and the like. In this connection, there have been several attempts to develop light support apparatus which is capable of selective illumination. For example, U.S. Pat. No. 4,192,427 to Bergman sets forth a retractable means for supporting lights and other equipment. The support of individual lights is selective and of secondary consideration in the Bergman application which may utilize other equipment. The Bergman patent sets forth the use of individual lights and the device provides no means for support of cargo or the illumination of such cargo.

U.S. Pat. No. 4,319,307 to Turner sets forth an illuminated handle bar with the use of a florescent bulb therein powered by a DC power supply. Apertures throughout the light bar permit the illumination of light therethrough. The Turner device is of interest in citing an elongate light bar out of rather limited applicability in an automotive environ.

U.S. Pat. No. 4,428,037 to Cardoza et al, sets forth a light bar including an adjustable standard supporting a rectangular and circular light combination for relative light producing characteristics of either unit. While an interesting example of alternative light supplies for a particular application such as in use a repair-truck, the light bar is of limited applicability for use in illuminating a cargo support area and selectively a field of view about a cargo area.

U.S. Pat. No. 4,515,393 sets forth the invention of an illuminated roll bar as to be used in motor vehicles and more specifically for off road motor vehicles where as a safety precaution, the roll bar provides a modicum of protection for an open-top vehicle and furthermore provides an illumination point, as required for such vehicles due to variations of terrain and geography.

U.S. Pat. No. 4,532,578 to Gaden et al, sets forth a rather typical vehicular lamp mounting arrangement about a motor vehicle body panel. The arrangement provides no cargo support area nor does it provide selective illumination within and without a defined perimeter. Essentially the patent sets forth the notion of providing essential indicating illumination dependent on vehicle function, such as braking, backing up, etc.

U.S. Pat. No. 4,591,954 to Kawamura et al, provides a stair-step brake light arrangement and attachment means to a motor vehicle. Essentially the respective stair-step light arrangement improves light transmission for visibility to following vehicles relative thereto.

U.S. Pat. No. 220,058 and U.S. Pat. No. 224,559 are essentially automotive body panel illuminating device and are apparently of interest relative to their configuration, as is U.S. Pat. No. 227,799.

In the same vein, U.S. Pat. Nos. 279,714 and 281,412 are variations on a well established theme of providing vehicular attached illumination panels for visibility.

As such, it may be appreciated that there is a continuing need for a new and improved illuminated cargo rack that addresses both the problems of storage and selective illumination both within and without the storage area, and in this respect, the present invention substantially fulfills this need.

SUMMARY OF THE INVENTION

In view of the foregoing disadvantages inherent in the known types of cargo racks now present in the prior art, the present invention provides an illuminated cargo rack wherein the same may be utilized to support cargo and selectively apply illumination to within the cargo area or to without the cargo area, as may be deemed necessary. As such, the general purpose of the present invention, which will be described subsequently in greater detail, is to provide a new and improved illuminated cargo rack which has all the advantages of the prior art cargo racks and none of the disadvantages.

To attain this, the present invention comprises an illuminated light bar of designated angular configuration to provide a cargo support defining perimeter. A plurality of vertically positioned stanchions support the light bar at a predetermined elevation above a support surface whereupon said stanchions are formed with means to secure the light bar assembly to said support surface. A medially positioned reflective surface within the light bar enables illumination selectively of the defined cargo support area or alternatively, illumination of the area defined outside of the cargo support area.

My invention resides not in any one of these features per se, but rather in the particular combination of al lof them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quicky from a cursory inspection the nature and essence of the technical disclosure of the application. The abstract is neither intended to define the invention of the application, which is measured by the claims, nor it is intended to be limiting as to the scope of the invention in any way.

It is therefore an object of the present invention to provide a new and improved illuminated cargo racks which has all the advantages of the prior art illuminated cargo racks and none of the disadvantages.

It is another object of the present invention to provide a new and improved illuminated cargo rack which may be easily and efficiently manufactured and marketed.

It is a further object of the present invention to provide a new and improved illuminated cargo racks which is of a durable and reliable construction.

An even further object of the present invention is to provide a new and improved illuminated cargo rack which is susceptible of a low cost of manufacture with regard to both materials and labor, and which accordingly is then susceptible of low prices of sale to the consuming public, thereby making such illuminated cargo racks economically available to the buying public.

Still yet another object of the present invention is to provide a new and improved illuminated cargo rack which provides in the apparatuses and methods of the prior art some of the advantages thereof, while simultaneously overcoming some of the disadvantages normally associated therewith.

Still another object of the present invention is to provide a new and improved illuminated cargo rack including an angulated illumination bar supported by a plurality of vertically oriented stansions.

Yet another object of the present invention is to provide a new and improved illuminated cargo rack which may be selectively illuminated within or without its defined perimeter.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric view illustraitng my present invention, its configuration, parts and interrelationship thereof.

FIG. 2 is an orthographic front view of my invention.

FIG. 3 is an orthographic side view of my invention taken along the lines 3—3 of FIG. 1 in the direction indicated by the arrows.

DESCRIPTION OF THE PREFERRED EMBODIMENT

With reference now to the drawings, and in particular to FIG. 1 thereof, a new and improved illuminated cargo rack embodying the principles and concepts of the present invention and generally designated by the reference numeral 10 will be described.

More specifically, it will noted that the illuminated cargo rack apparatus 10 essentially comprises a transparent light bar 11 formed of any suitable material, such as those from the polymer-plastic family or of a glass with sufficient impact resistance for use in an automotive environment. A plurality of vertically oriented stanchions 12 are formed with base portions 13 securable to a desired support surface, such as the roof of an automotive motor vehicle, as illustrated per FIG. 1. Illuminated cargo rack 10 is configured of a general "U" shaped configuration with its normal orientation such that the terminal ends of transparent light bar 11 are directed towards the rear of a vehicle, but of course may be reversed if desired dependent on user discretion. Furthermore, the illuminated cargo rack is not to be confined to a "U" shaped configuration but may be of an enclosed, endless loop configuration or any of a number of geometric shapes dependent upon intended use.

As illustrated in FIG. 3, a double face dmirror 14 is positioned longitudinally of transparent light bar 11 and oriented somewhat medially thereof but may be offset, as illustrated in FIG. 3, to accommodate a somewhat larger light source, as indicated at 15. In this manner, a somewhat greater output light source 15 may be oriented to illuminate exteriorly of transparent light bar 11. Accordingly, interiorly positioned longitudinal light source 15 may be of a somewhat lesser illumination strength. The larger strength of light source 16 may be desired to provide illumination about the area defined exteriorly of a perimeter defined by illuminated cargo rack 10. Interior area 17 defined by the interior perimeter of transparent light bar 11 could be of a lesser illumination strength. Typically, cargo such as suitcases may be confined and supported within area 17 and as normally the instance, a user of a motor vehicle and of my invention will normally stop at a lodging after dark and may be desirous of illuminating the area 17 supporting the suitcases and luggage normally utilized in traveling and therefore a smaller illumination source relative to light source 16 would be all that is required to provide illumination of this area relative to the expanse of area defined exteriorly of cargo rack 10.

As may best seen in FIG. 3, light sources 15 and 16 are operatively associated with a common ground wire 18 in a typical DC circuit typical of automotive electrical systems. Positive voltage electrical wires 21 and 22 have associated therewith switches 19 and 20 to enable selective illumination of the area 17 defined by the inner perimeter of illuminated cargo rack 10 and the area defined exteriorly of illuminated cargo rack 10 by utilization of switches 19 and 20 respectively, as noted above.

With respect to the above description then, it is to be realized that the optimum dimensional relationship for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skille din the art, it is not desired to limit the invention to the exact construction and operation shown and described, and accordingly, all suitable modifications and equivalents may be resorted to, failling within the scope of the invention.

What is claimed as being new and desired to be protected by Letters Patent of the United States is as follows:

1. An illuminated cargo rack for securement and illumination of cargo positionable therein for attachment to an exterior surface of a motor vehicle comprising,
a single elongate, tabular light bar means for defining a securement perimeter for positioning of said cargo therein, and
means for positioning said light bar a spaced distance above said surface, and
wherein said means for positioning said light bar include a plurality of vertically oriented stanchions securing said light bar proximate one terminal end and securable to said surface at another terminal end, and
first and second light sources positioned within said light bar and
switching means for selectively illuminating said first and second light sources within said light bar, and
said first and second light sources are positioned on either side of a longitudinal co-extensive reflective mirror within said light bar, and
wherein said co-extensive mirror is vertically oriented relative to said light bar, and
said light bar is completely formed of a transparent exterior surface.

2. An illuminated cargo rack as set forth in claim 1 wherein said switching means includes a plurality of switches to selectively activate either of said longitudinal light sources.

3. An illuminated cargo rack as set forth in claim 1 wherein said light bar is formed of a plastic-like material.

4. An illuminated cargo rack as set forth in claim 11 wherein said light bar is formed of a glass material.

* * * * *